Oct. 8, 1957 R. E. BLOMQUIST 2,808,746
WORK HANDLING MECHANISM FOR MACHINE TOOLS
Filed Nov. 1, 1954 3 Sheets-Sheet 1
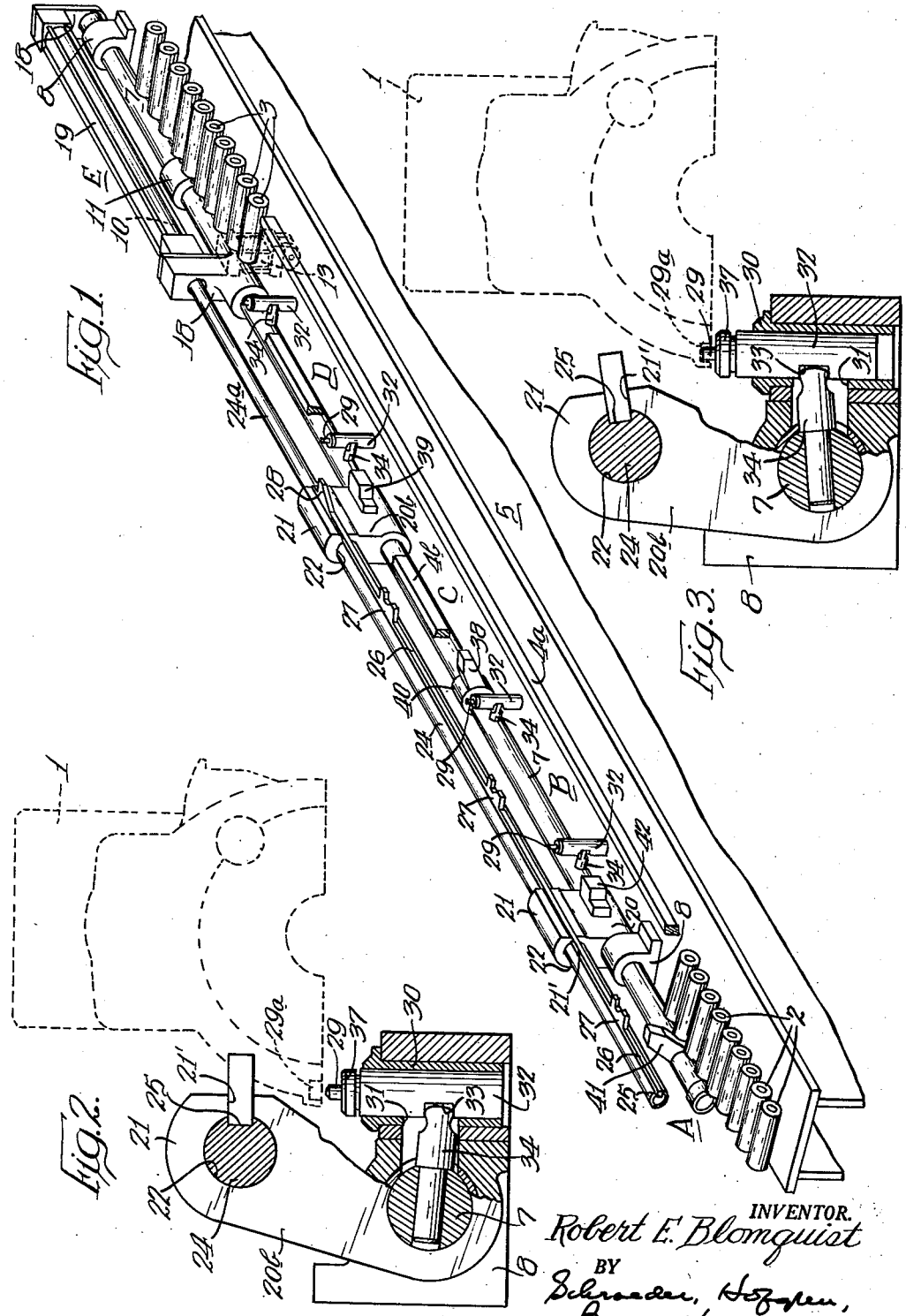
INVENTOR.
Robert E. Blomquist
BY
Schroeder, Hofgren,
Brady & Wegner
Attys.

Oct. 8, 1957  R. E. BLOMQUIST  2,808,746
WORK HANDLING MECHANISM FOR MACHINE TOOLS
Filed Nov. 1, 1954  3 Sheets-Sheet 2
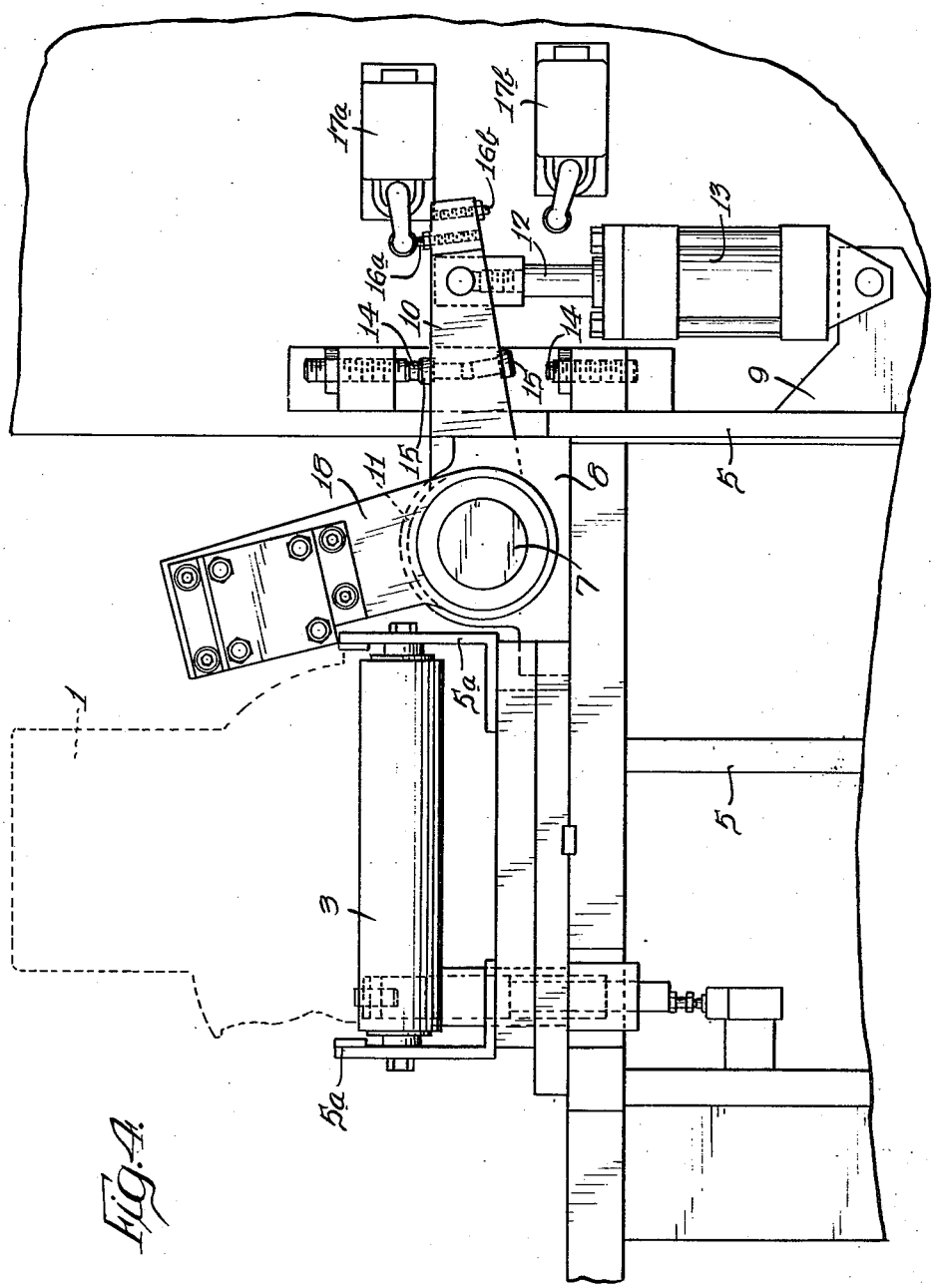
INVENTOR.
Robert E. Blomquist
BY
Schroeder, Hofgren, Brady, Thoennes
Attys.

Oct. 8, 1957                R. E. BLOMQUIST                 2,808,746
                WORK HANDLING MECHANISM FOR MACHINE TOOLS
Filed Nov. 1, 1954                                    3 Sheets-Sheet 3
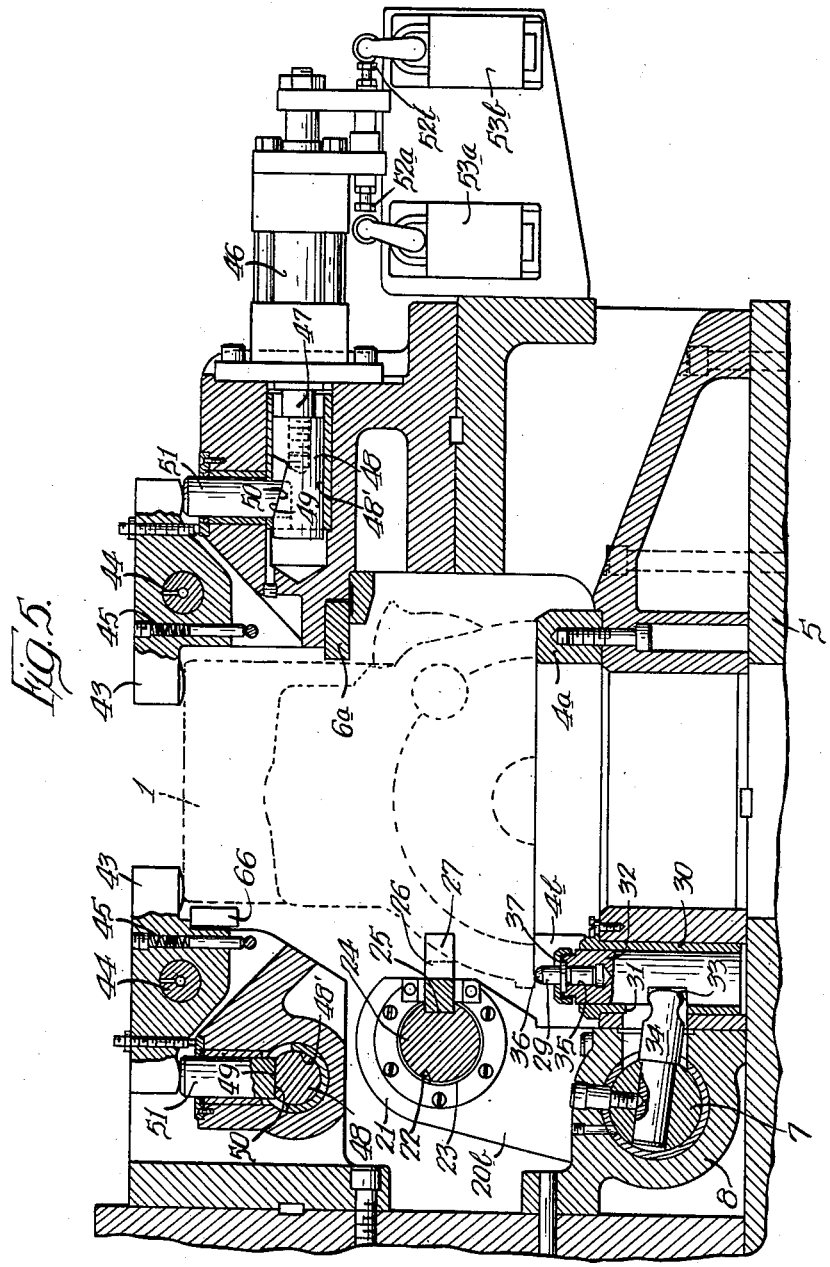
INVENTOR.
Robert E. Blomquist
BY
Schroeder, Hofgren, Brady & Wegner
Attys.

United States Patent Office 2,808,746
Patented Oct. 8, 1957

2,808,746

WORK HANDLING MECHANISM FOR MACHINE TOOLS

Robert E. Blomquist, Rockford, Ill., assignor to Sundstrand Machine Tool Co., a corporation of Illinois Application November 1, 1954, Serial No. 465,912

9 Claims. (Cl. 77—64)

This invention relates to a work handling apparatus for machine tools and more particularly to a work handling apparatus to be used in connection with a process line having a plurality of work stations.

The general object of this invention is to provide a new and improved apparatus of the character described for transferring workpieces through a plurality of machines or stations for successive machining operations and for locating and clamping a workpiece in each of said stations.

Another object of this invention is to provide a work handling apparatus of the character described in which workpieces are supported on a pair of rails which extend from a loading station through a series of work and idle stations to an unloading station, are moved between stations by a shuttle mechanism movable in an arcuate path between work-engaging and retracted positions and are located at the work stations by work locating pins or dowels engaged with the workpieces and movable between work-locating and withdrawn positions by the arcuate movement of the shuttle mechanism.

A further object of this invention is to provide a work handling device of the character described for transferring workpieces through successive work stations in which the workpieces are supported on a pair of elongated rails, the workpieces being moved between work stations by means of work-engaging members on a reciprocable shuttle arm, the shuttle arm being secured to and spaced from a pivot shaft which rocks the work-engaging members in an arcuate path into and out of engagement with the workpieces simultaneously as work-locating pins and stop blocks are moved by the pivot shaft out of and into engagement with the workpieces respectively to allow or prevent movement of a workpiece on the rails by the shuttle arm, the shuttle arm being slidably returned to its initial position when the work-engaging members thereon are out of engagement with the workpieces and the work-locating pins are in engagement with a workpiece.

Other objects and advantages will become apparent from the following detailed description taken in connection with the accompanying drawings, in which:

Fig. 1 is a diagrammatic view in perspective of the apparatus showing the relative positions of the supporting rails, pivot shaft and shuttle arm mechanism and having the different stations indicated;

Fig. 2 is a diagrammatic end view of the apparatus showing one limit position of the pivot shaft, in which position a work-engaging member on the shuttle bar is in engagement with a workpiece and a workpiece locating pin is in a withdrawn position;

Fig. 3 is a diagrammatic end view of the apparatus showing the other limit position of the pivot shaft, in which position a work-engaging member on the shuttle bar is out of engagement with a workpiece and a workpiece locating pin is in a locating position;

Fig. 4 is a right end elevational view of the invention with the clamping means omitted showing the pivot shaft actuating means; and Fig. 5 is an end vertical sectional view of the invention taken through one of the work stations and showing the workpiece locating means and clamping mechanism in section.

While the invention herein described is a preferred embodiment, it is not intended to limit the invention to the specific form and arrangements shown, it being contemplated that various changes may be made by those skilled in the art without departing from the spirit and scope of the appended claims.

One embodiment of the process line is shown in Fig. 1, wherein station A is a loading station while station E is an unloading station. In this embodiment, stations B and D are work stations wherein desired machining operations such as boring may be performed while station C is an idle station. It is believed obvious that any combination of work stations and idle stations may be used.

A workpiece 1 is initially supported upon a roller conveyor 2 at station A and upon a second roller conveyor 3 at station E and may be loaded and unloaded manually or mechanically, as by adjacent conveyors or cranes. Extending between roller conveyors 2 and 3 and through stations B, C and D is a pair of horizontal, parallel hardened rails 4a and 4b spaced so as to support the workpieces 1 which are to be transferred through the successive stations. Both the conveyors 2 and 3 and the rails 4a and 4b are supported by a conventional machine tool base structure, designated generally at 5, the rollers 2 and 3 being mounted in L-shaped brackets 5a.

While one rail 4a may be a continuous member, rail 4b must have a series of breaks or gaps to allow the movement above and below the top surface of rail 4b of workpiece movement blocking members and workpiece locating members, these members being more fully described in another part of this specification. To laterally guide the workpieces 1 as they are transferred between the work stations, side guide rails 6a and 6b are provided extending along the length of the machine tool assembly.

As shown in Fig. 1, a cylindrical pivot shaft 7 is rotatably mounted in a series of mounting brackets 8 secured to the base structure 5 so that pivot shaft 7 extends parallel and closely adjacent to skid rail 4b at a slightly lower level and for substantially the entire length of the rail 4b and conveyors 2 and 3. Pivot shaft 7 is rocked between two positions through the action of a hydraulic cylinder and piston means 13 vertically mounted adjacent unloading station E by means of a bracket 9 welded to base structure 5, as best shown in Fig. 4. A pivot arm 10 is welded at one end to a collar 11 which is secured to pivot shaft 7 so as to extend laterally therefrom and is pin connected at the other end to the outer end of a piston rod 12 operable in hydraulic cylinder 13. The limits of the rocking motion of pivot shaft 7 are determined by two adjustable positive stop members 14 positioned on base structure 5 so as to be abutted against by either of two pins 15 secured to pivot arm 10. A second set of pins 16a and 16b on pivot arm 10 are adapted to actuate members on two switches 17a and 17b which may be connected to respectively operate the transfer mechanism and the clamping mechanism.

As best shown in Fig. 1, two supporting members 18 are secured to pivot shaft 7 adjacent the two extremities of unloading station E and extending generally vertically upward from the pivot shaft 7. Supported between the upper portions of supporting members 18 is a cylinder and piston means 19 so as to be spaced above and parallel to pivot shaft 7. Also secured to pivot shaft 7 are two supporting guide arms 20a and 20b which also extend generally vertically upward from pivot shaft 7. The guide arms 20a and 20b are positioned on pivot shaft 7 adjacent to the exit end of loading station A and the exit end of idle station C, respectively, and have upper collar portions 21. Extending through each collar portion 21 is a horizontal cylindrical bore 22 having supported therein a sleeve 23, as best shown in Fig. 5. A longitudinally extending shuttle bar 24 is slidably mounted in sleeves 23 being spaced above and parallel to pivot shaft 7 and in alignment with cylinder and piston means 19.

Shuttle bar 24 extends approximately the length of three of the stations and has a longitudinal groove 25 extending the length thereof and opening generally toward rails 4a and 4b and conveyors 2 and 3 to tightly receive a longitudinal member 26 having a series of workpiece engaging members 27 and 28 extending laterally therefrom. The collar portions 21 of guide arms 20a and 20b and the sleeves 23 have slots 21' therein so as to allow the members 27 and 28 to pass therethrough. Work-engaging members 27 are provided for each of the first three stations and are positioned along shuttle bar 24 in alignment with the centerline of the work stations so as to engage a workpiece 1 approximately in the center thereof. With this arrangement, work-engaging members 27 are adapted for transferring workpieces from stations A, B and C to stations B, C and D respectively. To transfer a finished workpiece from work station D to unloading station E, the member 28 is positioned on member 26 adjacent the entrance to work station D so as to be engageable with the rear end of a finished workpiece 1 and transfer it to unloading station E.

To impart reciprocating movement to shuttle arm 24 and work-engaging members 27 and 28 with respect to pivot shaft 7 along the rails 4a and 4b, an extension 24a of the shuttle arm is connected at one end to the cylinder and piston means 19.

Thus, it is evident that as pivot shaft 7 is hydraulically rocked between its two positions, shuttle bar 24 is moved in an arcuate path so as to either bring work-engaging members 27 and 28 into engagement with the workpieces 1 or to withdraw members 27 and 28 from engagement with the workpieces 1. Shuttle bar 24 is slidable in one direction by cylinder and piston means 19 when part engaging members 27 and 28 are in engagement with the workpieces 1 to transfer the workpieces 1 to succeeding stations and in the opposite direction when part-engaging members 27 and 28 are out of engagement with workpieces 1 to return shuttle bar 24 to its initial position where it is ready to be rocked into position by pivot shaft 7 to again engage a series of workpieces 1 in the assembly.

Means are also provided to accurately locate and clamp the workpieces in the work stations simultaneously as the workpieces are released by the work-engaging members 27 and 28 on shuttle bar 24.

The workpiece locating operation is accomplished at each work station by means of a pair of dowels or locating pins 29 mounted slightly below skid rail 4b and adjacent to pivot shaft 7 so as to be vertically movable through the rocking action of pivot shaft 7 between a workpiece locating position in which pins 29 are received in mating recesses 29a in one side of the bottom surface of the workpiece 1 and a withdrawn position beneath the supporting surface of skid rail 4b. The positioning of part locating plunger pins 29 with respect to the work stations is best shown in Fig. 1. The actual mounting and actuating means for pins 29 is best shown in Fig. 5 wherein a hollow cylindrical casing 30 having an opening 31 in the wall thereof adjacent pivot shaft 7 is shown vertically mounted in base structure 5. A cylindrical member 32 having a side recess 33 therein adjacent to and smaller than casing wall opening 31 is slidably mounted in said casing.

A lever member 34 secured in pivot shaft 7 extends laterally therefrom, through wall opening 31 in casing 30, and is operably received in recess 33 so that as lever member 34 is rocked with pivot shaft 7, cylindrical member 32 is slidably moved up or down in casing 30, opening 31 in casing 30 being long enough in a vertical direction to allow free movement of lever 34 through the full rocking angle of pivot shaft 7. Cylindrical member 32 also has a vertical cylindrical recess 35 in its upper surface in which is mounted locating pin 29 which has a beveled upper edge 36 which allows for gradual seating of a pin 29 in the recess 29a in workpiece 1 and thus more accurate workpiece locating action. The pin 29 is held in recess 35 by means of a nut member 37.

Because of the angular positioning of levers 34 in pivot shaft 7, locating pins 29 are moved into a workpiece locating position simultaneously as workpiece engaging members 27 and 28 are rocked away from engagement with the workpieces and are moved into a withdrawn position simultaneously as workpiece engaging members 27 and 28 are rocked into engagement with workpieces 1 for transferring the workpieces between work stations. This is clearly shown in the two diagrammatic end views, Fig. 2 and Fig. 3, which show the comparative positioning of a workpiece engaging member 27 and a locating pin 29 with respect to a workpiece 1 in the two limit positions of pivot shaft 7.

A series of hydraulically actuated clamping devices are provided at each machining station to adequately clamp the workpieces to the rails 4a and 4b during the machining operations, a clamping device being provided at each of the four corners of the workpieces positioned in work stations B and D. As best shown in Fig. 5, each clamping device is conventionally mounted on the base structure 5 generally above rails 4a and 4b. The clamping action is provided by a clamping bar 43 which is pivotably mounted on a rod 44 and normally spring-urged away from clamping engagement with a workpiece 1 by a spring 45. To provide the clamping action a cylinder and piston means 46 having a piston shaft 47 connected to a member 48 slidably mounted in a bore 48' is actuated. Member 48 has a cam surface 49 in engagement with a mating cam surface 50 at one end of a vertically mounted slidable member 51 which at its other end is in direct engagement with clamping bar 43. As piston shaft 48 is moved in one direction by cylinder and piston means 46, one end of clamping bar 43 is forced downwardly against the upper surface of a workpiece 1 through the action of cam surface members 48 and 51. Hydraulically operated cylinder and piston means 46 are horizontally mounted, the ones disposed adjacent skid rail 4a having their axes transverse to shuttle bar 24 and the ones disposed adjacent skid rail 4b having their axes parallel to shuttle bar 24, as indicated in Fig. 5, there being no difference in their operation. Dogs 52a and 52b associated with cylinder and piston means 46 are adapted to contact members on switches 53a and 53b which may be connected to respectively rock work-engaging members 27 and 28 into engagement with the workpieces and start the machining operations.

Provision is also made in this invention for preventing any movement of a workpiece in the idle station C during the machining operations at stations B and D, there being no locating pins at this station. Also, means are provided to prevent the movement of a workpiece into the loading station A during the time the workpieces are being transferred between work stations and also for preventing over-travel of a workpiece entering the loading station A.

For preventing movement of a workpiece after it has been transferred to idle station C by a workpiece engaging member 27 and released from engagement therewith, two escapement arms or block members 38 and 39 are provided to respectively engage the rear and front ends of the workpiece. Escapement arm 38 is welded to a collar 40 secured to pivot shaft 7 while escapement arm 39 is secured to guide arm 20b on pivot shaft 7. When workpiece engaging members 27 are rocked into engagement with the workpieces 1, both escapement arms 38 and 39 are rocked downwardly below and through gaps in rail 4b and out of engagement with the workpiece in the idle station so as to allow transfer thereof to work station D and transfer of the next workpiece to idle station C.

While workpiece engaging members 27 and 28 are in engagement with and transferring workpieces between work stations, an escapement arm 41 secured directly to pivot shaft 7 adjacent the entrance to loading station A is in blocking position so as to prevent the movement of any workpieces into the loading station A, escapement arm 41 being rocked to an out-of-the-way position simultaneously as workpiece engaging members 27 and 28 release the workpieces so that a new workpiece may be moved into loading station A. To prevent over-travel of such a workpiece admitted to loading station A, a stop block 42 is secured to guide arm 20a adjacent to the exit from loading station A in a blocking position when escapement arm 41 is in an out-of-the-way position. Stop block 42 is rocked to a non-blocking position simultaneously as workpiece engaging members 27 and 28 are rocked into engagement with workpieces 1 so as to allow the transfer of the workpiece in loading station A to work station B.

The relationship of shuttle bar 24 to pivot shaft 7 and the hydraulic means for respectively sliding and rocking these members as well as the positioning thereon of workpiece engaging members 27 and 28, workpiece locating pins 29, and escapement arms or stop blocks 38, 39, 41 and 42 is clearly shown in Fig. 1, a perspective diagrammatic view of the invention, omitting clamping devices.

Initially, in the operation of this invention shuttle bar 24 is in its furthest left position (Fig. 1) with workpiece engaging members 27 and 28 in their non-engaging positions, locating pins 29 in their upper position, escapement arms 38, 39 and 42 in their movement blocking positions, and escapement arm 41 in its out-of-the-way position to allow the movement of the first workpiece 1 into loading station A. Shuttle bar 24 is then rocked into position by rotation of pivot shaft 7 so that a workpiece engaging member 27 engages the workpiece 1, locating pins 29 and escapement arms 38, 39 and 42 being simultaneously moved downwardly to non-blocking positions, and escapement arm 41 moved into its blocking position to prevent the movement of a second workpiece 1 into loading station A. Shuttle bar 24 is then hydraulically shifted to the right, transferring the first workpiece 1 to work station B. Workpiece engaging members 27 and 28 are then rocked out of engagement with the workpiece 1 simultaneously as locating pins 29 are moved into a work locating position, escapement arms 38, 39 and 42 are moved into blocking position, and escapement arm 41 is moved to an out-of-the-way position so as to allow the movement of a second workpiece into loading station A. Then the workpieces 1 are clamped to rails 4a and 4b and the machining operations are performed, during which time the shuttle bar 24 is hydraulically moved to the left to its initial position, ready for the next cycle of operation. These operations continue to advance the desired number of workpieces through the machine tool assembly one by one.

From the foregoing, it will be seen that from the interconnection of the pivot shaft 7 and the shuttle bar 24 and the numerous workpiece controlling members associated therewith that the workpieces are at all times under positive control, insuring proper operation of the apparatus.

I claim:

1. A work handling apparatus comprising, in combination; a pair of parallel rails extending horizontally from a loading station through a series of work and idle stations for supporting spaced workpieces, a pivot shaft rotatably mounted adjacent to and extending alongside said rails, a pair of shuttle bar guide arms secured to the pivot shaft and extending upwardly therefrom, each of said arms having a slotted collar at its upper end, a shuttle bar disposed generally above said pivot shaft and extending parallel thereto and having a length substantially equal to that of the pivot shaft, said shuttle bar being slidably mounted in said guide bar collars, a series of work-engaging members extending laterally from the shuttle bar and spaced along its length a distance approximately equal to the distance between stations, the slot in each of said collars opening generally toward the skid rails to permit said work-engaging members to pass through and move to either side of the collars, a pair of workpiece locating plungers positioned at each work station adjacent said pivot shaft, means mounting said plungers for vertical movement between an upper work locating position and a lower withdrawn position, a plurality of levers extending laterally from said pivot shaft and into engagement with the work locating plungers, there being a lever associated with each plunger, means for moving the shuttle bar in one direction to advance workpieces when the work-engaging members are in engagement with workpieces and to move the shuttle bar in the other direction to return it to its initial position when the work-engaging members are out of engagement with the workpieces, and means for rocking the pivot shaft in one direction to move the shuttle bar and work-engaging members in an arcuate path away from engagement with the workpieces and simultaneously raise the workpiece locating plungers, and for rocking the pivot shaft in the other direction to move the work-engaging members into engagement with workpieces and to simultaneously lower the workpiece locating plungers from engagement with workpieces positioned thereabove.

2. A work handling apparatus comprising, in combination; spaced parallel rails and side guides extending through a machine tool assembly having a plurality of stations including work stations, a rotatably mounted pivot shaft mounted adjacent and parallel to said rails, means to rotate said shaft, a shuttle bar spaced above and extending parallel to said pivot shaft, said shuttle bar being slidably and non-rotatably mounted in a series of shuttle bar guide arms spaced along and secured to said pivot shaft so that said shuttle bar is moved in an arcuate path when said pivot shaft is rotated, a series of part pick up blocks extending laterally from said shuttle bar and associated one with each of said stations, a plurality of part locating pin plungers mounted adjacent the pivot shaft, a pair of said plungers being associated with each work station, said pin plungers being movable between two vertical positions by means of plunger levers extending laterally from said pivot shaft, blocking means associated with the stations other than work stations secured to said pivot shaft and guide arms and rotatable therewith, means for reciprocating the shuttle arm, movement of the shuttle arm in one direction being when said pivot shaft is in one limit position wherein said part locating pin plungers and blocking means are in an out-of-the-way position and said part pick up blocks on said shuttle bar are in engagement with the parts to be machined to move the parts from one station to the next succeeding station, and movement of the shuttle arm in the other direction occurring when said pivot shaft is in its other limit position wherein said part pick up blocks are in an out-of-the-way position with respect to said parts, to return the shuttle bar to its initial position, the part locating pin plungers and blocking means being in engagement with the parts, and clamping means above said rails to provide a downward force on the upper surface of the parts to clamp the parts to said rails during machining operations.

3. A work handling apparatus in a machine tool assembly comprising, in combination; a pair of horizontally extending, parallel spaced rails adapted to support a succession of workpieces at a series of work and idle stations, a pivot shaft mounted adjacent to and extending parallel to said rails and rotatable between two positions, a first hydraulic means operatively connected to rotate said pivot shaft, a shuttle bar spaced from and extending parallel to said pivot shaft, means slidably connecting said shuttle bar to said pivot shaft so that said shuttle bar is swung in an arc between two positions when said pivot shaft is rotated between its two positions and is longitudinally slidable with respect to said pivot shaft, a second hydraulic means operatively connected to slide said shuttle bar in two directions, workpiece pick up members secured to said shuttle bar and adaptable in one of said shuttle bar arcuate positions to engage and move workpieces between stations when said shuttle bar is slidably moved in one direction and in the second of said arcuate positions being out of engagement with the workpieces so that said shuttle bar may be slidably returned to its initial position, a plurality of pairs of vertically movable dowel pins movable between two positions, in one position being received in mating recesses in the workpieces so as to position the workpieces for machining operations and in another position being disengaged from the workpieces, and members secured to said pivot shaft operable to move said dowel pins vertically in and out of engagement with the workpieces.

4. A work handling device for a machine tool process line having a plurality of stations comprising, in combination; means extending through the series of stations for supporting a succession of workpieces, a pivot shaft extending along said supporting means and mounted for rotation between two positions, a shuttle bar extending generally above and parallel to said pivot shaft, means connecting said shuttle bar to said pivot shaft so that said shuttle bar may have a sliding movement independent of said pivot shaft and an arcuate movement by rotation of said pivot shaft, means connected to said shuttle bar to provide sliding movement thereof in two directions, laterally extending members on said shuttle bar adapted to engage the workpieces in one position of said pivot shaft so as to move the workpieces from one station to the next station on movement of said shuttle bar in one direction, work locating pins at certain of said stations movable between a work locating position and withdrawn position, levers operably connecting said pins to said pivot shaft, means operably connected to said pivot shaft for rotating said shaft in one direction to bring said work-engaging members into engagement with said workpieces and simultaneously to move said locating pins to a withdrawn position so that on sliding movement of said shuttle bar the workpieces will be advanced to the next succeeding station, and in the opposite direction to disengage said work-engaging members from the workpiece and simultaneously move said locating pins into a work locating position while said shuttle bar is slidably returned to its original position, and means for clamping the workpieces in certain of said stations.

5. A work handling apparatus comprising, in combination; a pair of parallel spaced rails supported by a frame and extending from a loading station through a series of work and idle stations for supporting a succession of parts to be machined at the different work stations, a pivot shaft rotatably mounted on the frame and extending along the entire length of said rails and at one side thereof, a shuttle bar spaced generally above said pivot shaft and extending parallel thereto, a series of laterally extending part engaging members on said shuttle bar associated one with each of the work and idle stations, a plurality of guide arms secured to said pivot shaft and having collars in which said shuttle bar is slidably mounted, said collars having longitudinal slots therein to allow the movement of said part engaging members past said guide arms, a pair of part locating pins positioned at each work station, means mounting said pins for vertical movement between an upper part locating position and a lower withdrawn position, a plurality of arms extending from said pivot shaft and into operable engagement with said part locating pins, a first hydraulic means operably connected to said pivot shaft for rocking the pivot shaft in one direction to move the shuttle bar in an arcuate path and carry said part engaging members away from engagement with the parts and to simultaneously raise the part locating pins, and for rocking the pivot shaft in the other direction to move the part engaging members into engagement with the parts and to simultaneously lower the part locating pins from engagement with the parts positioned thereabove, a second hydraulic means operably connected to said shuttle bar to slidably move the shuttle bar in one direction when said part engaging members are in engagement with the parts and in the opposite direction when said part engaging members are in out-of-the-way position, a stop member secured to said pivot shaft adjacent the entrance to the loading station adapted to prevent the movement of a part into the loading station when said part engaging members are rocked into engagement with the parts, and escapement members secured to said pivot shaft adjacent the exit from the loading station and the idle station operable to block movement of the parts when said part engaging members are rocked out of engagement with the parts.

6. A work handling apparatus comprising, in combination; spaced rails having associated side guide members extending from a loading station through a series of work and idle stations for supporting a succession of parts to be machined at the different work stations, a pivot shaft rotatably mounted on the frame and extending along the entire length of said rails and at one side thereof, a shuttle bar spaced generally above said pivot shaft and extending parallel thereto, a series of laterally extending part engaging members on said shuttle bar associated one with each of the work stations, a plurality of guide arms secured to said pivot shaft and having collars in which said shuttle bar is slidably mounted, said collars having longitudinal slots therein to allow the movement of said part engaging members past said guide arms, a pair of part locating pins positioned at each work station in which a machining operation is performed, means mounting said pins for vertical movement between an upper part locating position and a lower withdrawn position, a plurality of arms secured to said pivot shaft and in operable engagement with said part locating pins, hydraulic means operably connected to said pivot shaft for rocking the pivot shaft in one direction to move the shuttle bar in an arcuate path and carry said part engaging members away from engagement with the parts and to simultaneously raise the part locating pins, and for rocking the pivot shaft in the other direction to move the part engaging members into engagement with the parts and to simultaneously lower the part locating pins from engagement with the parts positioned thereabove, and a second hydraulic means operably connected to said shuttle bar to slidably move the shuttle bar in one direction when said part engaging members are in engagement with the parts and in the opposite direction when said part engaging members are in an out-of-the-way position.

7. A work handling apparatus comprising, in combination; spaced rails extending from a loading station through a series of work and idle stations for supporting a succession of parts to be machined at the different work stations, a rotatably mounted pivot shaft extending along one side of the rails, a shuttle bar spaced generally above said pivot shaft and extending parallel thereto, a plurality of guide arms secured to said pivot shaft and having cylindrical bores in which said shuttle bar is slidably mounted, a series of laterally extending part engaging members on said shuttle bar, at least one part locating pin positioned at each work station, means mounting said pins for vertical movement between an upper part locating position and a lower withdrawn position, a plurality of arms secured to said pivot shaft and in operable engagement with said part locating pins, means operably connected to said pivot shaft for rocking the pivot shaft in one direction to move the shuttle bar in an arcuate path and carry said part engaging members away from engagement with the parts and to simultaneously raise the part locating pins, and for rocking the pivot shaft in the other direction to move the part engaging members into engagement with the parts and to simultaneously lower the part locating pins from engagement with the parts positioned thereabove, means operably connected to said shuttle bar to slidably move the shuttle bar in one direction when said part engaging members are in engagement with the parts and in the opposite direction when said part engaging members are in an out-of-the-way position, a plurality of pivotally mounted members adapted to clamp the parts to the rails during machining operations, and means for actuating each of said clamping members.

8. A work handling apparatus comprising, in combination; a work station, rails extending through the work station for supporting a succession of workpieces, a shuttle bar having means for engaging a workpiece extended alongside said rails, means mounting the shuttle bar for rocking movement in an arcuate path and for sliding movement parallel to said rails, means for causing sliding movement of the shuttle bar in opposite directions, work locating dowels at the work station movable between a work locating position and a withdrawn position, connecting means between the dowels and the shuttle bar mounting means, and means operatively connected to the shuttle bar mounting means for rocking said mounting means to move the shuttle bar in one direction to withdraw the work-engaging means on the shuttle bar from engagement with a workpiece and for simultaneously moving the dowels into locating engagement with the workpiece, said rocking means alternately withdrawing the dowels from the workpiece and simultaneously rocking the shuttle bar in the other direction to position the shuttle bar whereby the work-engaging members thereon engage a workpiece so that the workpiece may be transferred from the work station.

9. A work handling apparatus for advancing workpieces through a line including work stations comprising, in combination; means for supporting a succession of workpieces in and between work stations, a slidable work engaging transfer member for moving workpieces forwardly along the line and movably mounted to move into and out of engagement with workpieces on the supporting means, work engaging locating dowels at the work stations movable into and out of engagement with the workpieces to accurately locate said workpieces in said work stations, an elongated, rotatably mounted actuating member for the transfer member and dowels extending along said line and operatively connected at spaced points along its length to said transfer member and said dowels for simultaneously moving the dowels out of and the transfer member into engagement with said workpieces in one direction of rotation and for simultaneously moving the dowels into and the transfer member out of engagement with said workpieces in the other direction of rotation, means for rotating said elongated member in two directions, and means for sliding the transfer member forwardly along the work stations when in engagement with the workpieces and rearwardly when out of engagement with the workpieces.

References Cited in the file of this patent

UNITED STATES PATENTS

| | | |
|---|---|---|
| 2,160,476 | Kampmeier | May 30, 1939 |
| 2,193,840 | Oberhoffken et al. | Mar. 19, 1940 |